(12) United States Patent  (10) Patent No.: US 8,559,822 B2
Hsu  (45) Date of Patent: Oct. 15, 2013

(54) OPTICAL FIBER HUB INCLUDING OPTICAL BOOSTER AMPLIFIER

(75) Inventor: Chia-Ling Hsu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 333 days.

(21) Appl. No.: 13/037,134

(22) Filed: Feb. 28, 2011

(65) Prior Publication Data

US 2012/0170940 A1    Jul. 5, 2012

(30) Foreign Application Priority Data

Dec. 29, 2010 (TW) .............................. 99146517 A

(51) Int. Cl.
*H04J 14/02* (2006.01)
(52) U.S. Cl.
USPC .................................. 398/82; 398/86; 398/88
(58) Field of Classification Search
USPC ....................................................... 398/82–88
See application file for complete search history.

(56) References Cited

U.S. PATENT DOCUMENTS

| | | | | |
|---|---|---|---|---|
| 7,809,232 B2* | 10/2010 | Reagan et al. | ................. | 385/134 |
| 7,963,799 B1* | 6/2011 | Lee et al. | ................. | 439/607.23 |
| 2006/0165413 A1* | 7/2006 | Schemmann et al. | .......... | 398/71 |
| 2011/0293277 A1* | 12/2011 | Bradea et al. | ................... | 398/66 |

\* cited by examiner

*Primary Examiner* — Dzung Tran
(74) *Attorney, Agent, or Firm* — Altis & Wispro Law Group, Inc.

(57) ABSTRACT

An optical fiber hub includes an upstream interface for inputting a laser beam, an optical booster amplifier, a splitting element, and N downstream interfaces. The optical booster amplifier is optically communicated with the upstream interface, and configured for amplifying the laser beam. The splitting element is optically communicated with the optical booster amplifier, and configured for splitting the amplified laser beam into N laser beams. The N downstream interfaces are optically communicated with the splitting element. Each of the N downstream interfaces is configured for outputting one of the N laser beams, wherein N is an integer which is equal to or greater than 2.

6 Claims, 2 Drawing Sheets

OPTICAL FIBER HUB INCLUDING OPTICAL BOOSTER AMPLIFIER

CROSS REFERENCE TO RELATED APPLICATION

This application is related to a commonly-assigned co-pending application, 13/037,127, and entitled "OPTICAL FIBER HUB".

BACKGROUND

1. Technical Field

The present disclosure relates to a hub, and particularly, to an optical fiber hub including an optical booster amplifier.

2. Description of Related Art

Optical fiber connectors have been widely used as bus interfaces for installing and expending conventional USB hosts and USB function device. For instance, the USB host can be a computer, the USB function device can be a computer peripheral, such as a keyboard, a mouse, a printer, a camera, or a projector. However, the USB host is generally coupled with the USB function device through a single optical fiber connector. This fails to satisfy requirements of simultaneously transmitting signals from an USB host to a plurality of USB function devices. Therefore, it is desired to provide an optical fiber hub capable of connecting a plurality of downstream peripherals to a single upstream host to overcome the at least one the aforementioned shortcomings.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present optical fiber hub will now be described in detail and with reference to the drawings.

Figure 1:
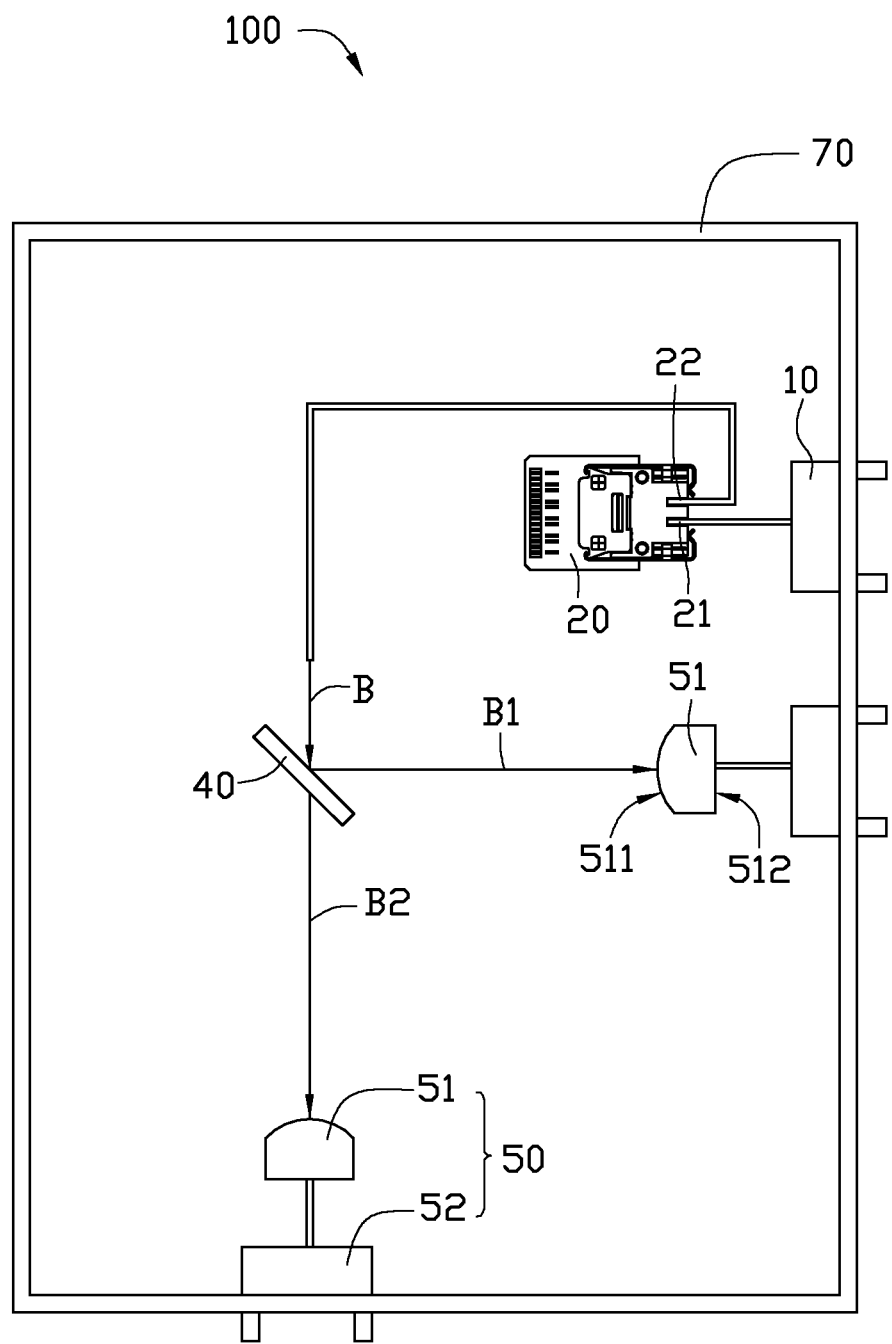
FIG. 1 is a cross-sectional, top plan view of an optical fiber hub in accordance with a first embodiment.

Referring to FIG. 1, an optical fiber hub 100 is depicted. The optical fiber hub 100 includes a rectangular casing 70. Additionally, the optical fiber hub 100 includes an upstream interface 10, an optical booster amplifier 20, a splitting element 40 and two downstream interfaces 50 all assembled in the casing 70. The upstream interface 10 is configured for communication with a host, such as a computer, or a projector. Each of the downstream interfaces 50 is configured for communication with a USB function peripheral, such as a camera, a cell phone, or a camera.

The upstream interface 10 is a plug or a receptacle of a typical optical fiber connector for receiving laser beams from the host. That is, briefly described hereinafter, the plug includes at least one input unit and the receptacle includes at least one output unit. Each of the at least one input unit includes a first lens portion and an input optical fiber optically coaxial with the first lens portion. The input optical fiber is located at a focus of the first lens portion, and an end thereof is adjacent to the first lens portion. Each of the at least one output unit includes an output optical fiber and a second lens portion optically coupled with the output optical fiber. The output optical fiber is located at a focus of the second lens portion, and an end thereof is adjacent to the second lens portion. When in use, the plug is optically coupled with the receptacle with the first lens portion optically coaxial with the second lens portion.

The optical booster amplifier 20 is configured for amplifying an intensity of the laser beam transmitted from the upstream interface 10, and can be an optical amplifier or a Raman optical amplifier. The optical booster amplifier 20 includes an input port 21 and an output port 22. The input port 21 optically communicates with the upstream interface 10 with an optical fiber, and the output port 22 transmits the amplified laser beam to the splitting element 40 with an optical fiber to irradiate the splitting element 40.

The splitting element 40 splits the amplified laser beam, labeled with B, into a reflection laser and a transmission laser, respectively labeled with B1 and B2. As shown in FIG. 1, the beam splitting element 40 includes a transflective splitter. Each downstream interface 50 outputs a corresponding one of the two laser beams B1, B2.

Each downstream interface 50 includes a converging element 51 and a port 52. The converging element 51 is configured for converging the irradiated laser beam. In detail, the converging element 51 includes a convex incident surface 511 and a flat emitting surface 512 opposite to the incident surface 511. Take the laser beam B1 for instance, the reflection laser beam B1 is converged by the incident surface 511 and then emitted from the emitting surface 512 to the port 52. The port 52 can be a receptacle or a plug of a typical optical fiber connector. In addition, the converging element 51 can be a receptacle or a plug of a typical optical fiber connector. Furthermore, the converging element 51 can be a double-sides convex lens, a lens group consisted of a plurality of lenses, or a prism group consisted of a plurality of prisms.

In the present embodiment, the optical fiber hub 100 employs the optical booster amplifier 20 to amplifying the laser beam, the splitting element 40 to split the laser beam into two beams, and the two downstream interfaces 50 to respectively receive the two beams. Therefore, laser beam from the upstream interface 10 can be simultaneously transmitted to downstream peripherals connected with the two downstream interfaces 50.

Figure 2:
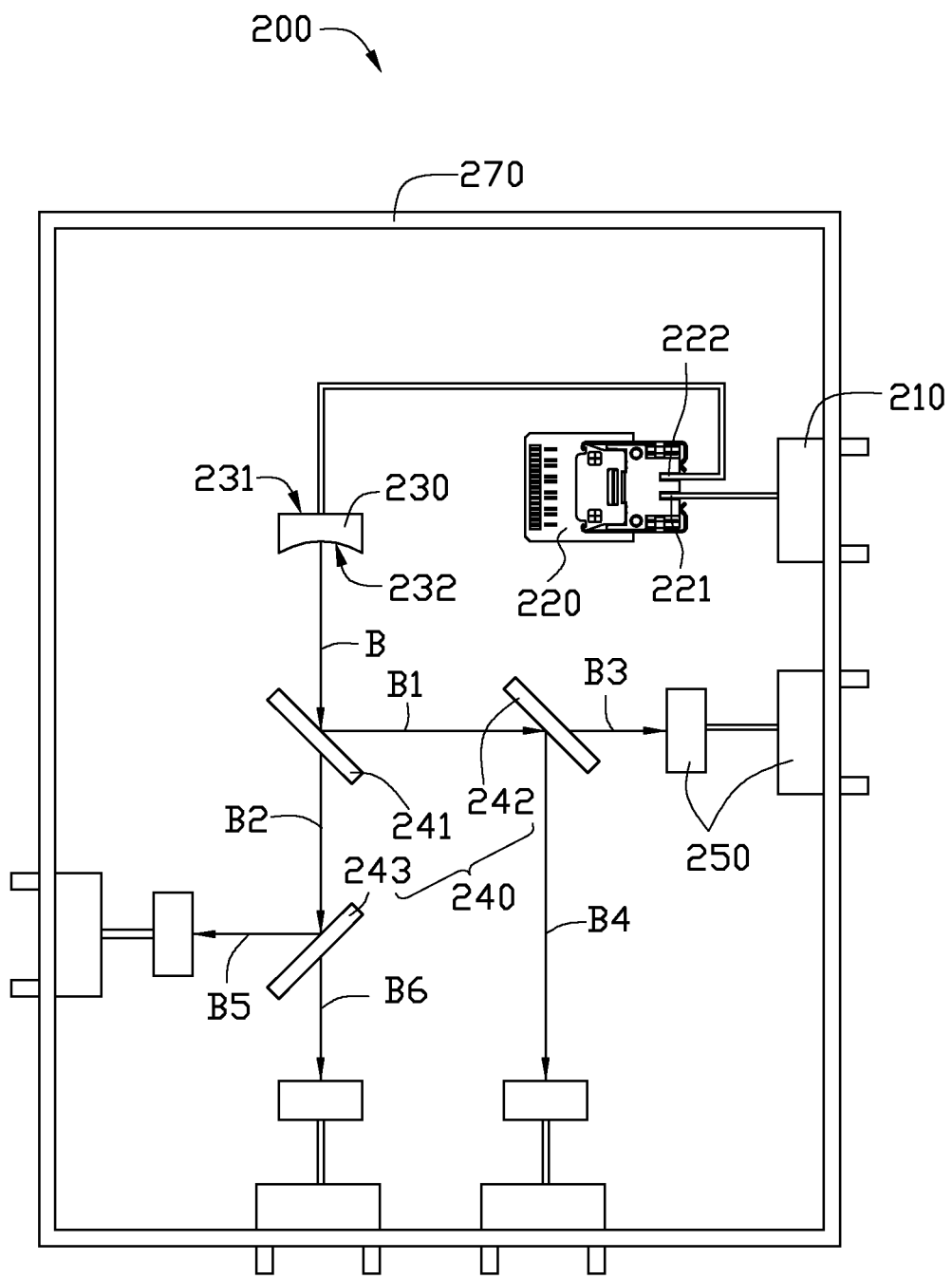
FIG. 2 is a cross-sectional, top plan view of an optical fiber hub in accordance with a second embodiment.

Referring to FIG. 2, an optical fiber hub 200 provided in a second embodiment includes a upstream interface 210, a beam booster amplifier 220 having an input 221 and an output 222, a splitting element 240, four downstream interfaces 250, and a light spreading element 230. The optical fiber hub 200 further includes a casing 270 for housing the components aforementioned.

The light spreading element 230 optically communicates with the output 222 of the beam booster amplifier 220, and includes a flat incident surface 231 and a concave emitting surface 232 opposite to the incident surface 231. The concave emitting surface 232 spreads the amplified laser beam. As such, irradiation area of the amplified laser beam on the splitting element 240 is increased and is a benefit for precise assembly of the optical fiber hub 200. In addition, the light spreading element 230 can be an optical unit capable of spreading light, such as double-sides concave lens, an optical unit consisting of a prism and a splitter.

The beam splitting element 240 includes three transflective splitters, herein, respective designated as a first splitter 241, a second splitter 242 and a third splitter 243. The first splitter 241 is arranged on a light path of the light spreading element 230 facing the concave emitting surface 232, and configured for splitting the spread laser beam B into a first reflection laser beam B1 and a first transmission laser beam B2. The first reflected beam B1 is then divided into a second transmission laser beam B3 and a second reflection laser beam B4 by the second splitter 242. The second transmission laser beam B3 is received by one of the four downstream interfaces 250. The second reflection laser beam B4 is received by another of the four downstream interfaces 250. The first transmission laser beam B2 irradiates on the third splitter 243, and is divided into a third reflection laser beams B5 and a third transmission laser beams B6 by the third splitter 243. The third reflection laser beam B5 is received by yet another downstream interface 250. The third transmission laser beam B6 is transmitted to still another downstream interface 250. In a word, each transflective splitter splits the laser beam transmitted thereto into a transmission laser beam and a reflection laser beam.

In other embodiments, the beam splitting element 240 can include more transflective splitter. Supposing N downstream interfaces 250 are desired in an actual use, N is an even integer which is equal to or greater than 2, accordingly, N−1 transflective splitters are needed. In assembly the optical fiber hub 200, arrangements of the N−1 splitting members should satisfy following conditions. The first one of the N−1 transflective splitters faces the output 222 of the optical booster amplifier 220 when the light spreading element 230 is eliminated. Otherwise, the first one of the N−1 transflective splitters faces the emitting surface 232 of the light spreading element 230. The first splitter splits the amplified laser beam into a first reflection laser beam and a first transmission laser beam. The first transmission laser is divided into a second transmission laser beam and a second reflection laser beam by the second splitter, the first reflection laser beam is divided into a third transmission laser beam and a third reflection laser beam by the third splitter. It is analogized that, each of the N−1 transflective splitters splits the light beam reflected on it into a transmission laser beam and a reflection laser beam in the aforementioned manner till the amplified laser beams are divided into N beams, and each beam is transmitted to a corresponding downstream interface.

The described embodiments are intended to illustrate rather than limit the disclosure. Variations may be made to the embodiments without departing from the spirit of the disclosure. Accordingly, it is appropriate that the appended claims be construed broadly and in a manner consistent with the scope of the disclosure.

What is claimed is:

1. An optical fiber hub, comprising:
    an upstream interface for receiving a laser beam;
    an optical booster amplifier optically communicating with the upstream interface, the optical booster amplifier configured for amplifying the laser beam;
    a light spreading element comprising a flat incident surface and a concave emitting surface opposite to the incident surface, the light spreading element optically communicating with the optical booster amplifier at the flat incident surface, the light spreading element configured for spreading the amplified laser beam so as to increase an irradiation area of the amplified laser beam on the first splitter;
    N−1 transflective splitters comprising a first splitter, a second splitter, a third splitter, . . . , an (N−1)th splitter, the first splitter of the N−1 transflective splitters arranged on a light path of the light spreading element facing the concave emitting surface and configured for splitting a spread laser beam exiting from the concave emitting surface into a first transmission laser beam and a first reflection laser beam, the first transmission laser beam divided into a second transmission laser beam and a second reflection laser beam by the second splitter, the first reflection laser beam divided into a third transmission laser beam and a third reflection laser beam by the third splitter, it is analogized that, each of the N−1 transflective splitters is configured for splitting the laser beam transmitted on it into a transmission laser beam and a reflection laser beam in the aforementioned manner such that the amplified laser beam is divided into N laser beams; and
    N downstream interfaces, each of the N downstream interfaces configured for outputting one of the N laser beams, wherein N is an integer which is equal to or greater than 4.

2. The optical fiber hub of claim 1, wherein the upstream is a receptacle of an optical fiber connector.

3. The optical fiber hub of claim 1, wherein the upstream is a plug of an optical fiber connector.

4. The optical fiber hub of claim 1, further comprising a casing housing the upstream interface, the N downstream interfaces, the splitting element, and the optical booster amplifier.

5. The optical fiber hub of claim 1, wherein each of the downstream interfaces comprises a converging element for converging a corresponding laser beam irradiated thereon, and a port optically communicated with the converging element.

6. The optical fiber hub of claim 1, wherein N is an even integer which is equal to or greater than 4.

* * * * *